(12) United States Patent
Bei et al.

(10) Patent No.: US 10,410,601 B2
(45) Date of Patent: Sep. 10, 2019

(54) DISPLAY PANEL AND DISPLAY DEVICE

(71) Applicant: XIAMEN TIANMA MICRO-ELECTRONICS CO., LTD., Xiamen (CN)

(72) Inventors: Liangliang Bei, Xiamen (CN); Hao Wu, Xiamen (CN); Wei Wu, Xiamen (CN); Guozhao Chen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 16/147,587

(22) Filed: Sep. 29, 2018

(65) Prior Publication Data

US 2019/0035352 A1 Jan. 31, 2019

(30) Foreign Application Priority Data

Nov. 1, 2017 (CN) .......................... 2017 1 1057653

(51) Int. Cl.
*G09G 3/36* (2006.01)
*G02F 1/1362* (2006.01)

(52) U.S. Cl.
CPC ..... *G09G 3/3688* (2013.01); *G02F 1/136204* (2013.01); *G02F 1/136286* (2013.01); *G09G 3/3648* (2013.01); *G09G 3/3677* (2013.01); *G09G 2300/0413* (2013.01); *G09G 2300/0426* (2013.01); *G09G 2300/0439* (2013.01); *G09G 2330/06* (2013.01)

(58) Field of Classification Search
None
See application file for complete search history.

(56) References Cited

U.S. PATENT DOCUMENTS

| | | | | |
|---|---|---|---|---|
| 9,490,305 | B2 * | 11/2016 | Lee | ..................... H01L 27/3213 |
| 2008/0024415 | A1 * | 1/2008 | Jung | ................... G02F 1/13454 345/92 |
| 2010/0295843 | A1 * | 11/2010 | Liu | ....................... G09G 3/3614 345/214 |
| 2011/0315853 | A1 * | 12/2011 | Cho | .................. H01L 27/14605 250/208.1 |

(Continued)

FOREIGN PATENT DOCUMENTS

CN 102983114 A 3/2013

*Primary Examiner* — Nicholas J Lee
(74) *Attorney, Agent, or Firm* — Kilpatrick Townsend & Stockton LLP

(57) ABSTRACT

A display panel and a display device are provided. The display panel has a pixel region and a frame region surrounding the pixel region. The pixel region includes sub-pixels each including a first transistor and a pixel electrode. The plurality of sub-pixels includes display sub-pixels and dummy sub-pixels. At least part of the dummy sub-pixels are antistatic sub-pixels. A data line is configured to provide a driving signal to the display sub-pixels. A scan line is configured to provide scan signal to the display sub-pixels. A first reference signal line is configured to provide static protection reference signal to the antistatic sub-pixels. The first gate electrode of the first transistor of the antistatic sub-pixel is connected to the first drain electrode and a first reference signal line, and the first source electrode of the first transistor of the antistatic sub-pixel is connected to the data line.

20 Claims, 8 Drawing Sheets

(56) References Cited

U.S. PATENT DOCUMENTS

2014/0104249 A1* 4/2014 Furihata ............... G09G 3/3674
  345/204
2014/0346475 A1* 11/2014 Cho ..................... H01L 27/326
  257/40
2015/0262526 A1* 9/2015 Park ..................... G09G 3/3233
  345/76

* cited by examiner

DISPLAY PANEL AND DISPLAY DEVICE

CROSS-REFERENCE TO RELATED APPLICATIONS

The present disclosure claims priority to Chinese Patent Application No. 201711057653.3, filed on Nov. 1, 2017, the content of which is incorporated herein by reference in its entirety.

TECHNICAL FIELD

The present disclosure relates to the field of display technologies, and in particular, to a display panel and a display device.

BACKGROUND

During a manufacturing process of a liquid crystal module (LCM), from the process of integrating a printed circuit board into the liquid crystal display panel to assembling of various modules, the situations of moving, contacting and detaching are inevitable to occur among the objects to be assembled, equipment or person. Therefore, a phenomenon of electrostatic discharge (ESD) may inevitably occur on the objects to be assembled, damaging the display panel.

At present, an antistatic circuit for discharging static electricity on a data line is usually arranged on an upper frame of the display panel, and usually occupies a height of about 90 um. From the development of the display panel, the full screen design has become a trend, therefore compressing the frame of the display panel has become an inevitable subject. The upper frame of the display panel has become a bottleneck of compressing the frame due to arrangement of the antistatic circuit.

Therefore, there is a need to provide a display panel and a display device, which can solve an urgent problem to be solved in the art that the frame cannot be further compressed due to the arrangement of the antistatic circuit on the upper frame of the display panel.

SUMMARY

In view of the above, the present disclosure provides a display panel and a display device, which can solve the above mentioned problem that the frame cannot be further compressed due to the arrangement of the antistatic circuit on the upper frame of the display panel.

In order to solve the above technical problem, the present disclosure provides a display panel, including a pixel region and a frame region surrounding the pixel region, and the pixel region includes sub-pixels, each of the plurality of sub-pixels includes a first transistor and a pixel electrode, the first transistor includes a first gate electrode, a first source electrode, and a first drain electrode; the plurality of sub-pixels includes display sub-pixels and dummy sub-pixels, the dummy sub-pixels are adjacent to the frame region and are located between the display sub-pixels and the frame region, and at least part of the dummy sub-pixels are antistatic sub-pixels; a data line configured to provide a driving signal to the display sub-pixels; a scan line configured to provide a scan signal to the display sub-pixels; and a first reference signal line configured to provide a static protection reference signal to the antistatic sub-pixels; and the first gate electrode of the first transistor of the display sub-pixel is connected to the scan line, the first source electrode of the first transistor of the display sub-pixel is connected to the data line, the first drain electrode of the first transistor of the display sub-pixel is connected to the pixel electrode, the first gate electrode of the first transistor of the antistatic sub-pixel is connected to the first drain electrode and connected to the first reference signal line, and the first source electrode of the first transistor of the antistatic sub-pixel is connected to the data line.

In order to solve the above technical problem, the present disclosure further provides a display device, including any one of the display panel provided in the present disclosure.

Compared to the related art, the display panel and display device provided in the present disclosure can bring the following beneficial effects:

The circuit connection of at least part of the dummy sub-pixels is changed, and embedding the antistatic circuit into the position at which the dummy sub-pixel is located, so that this part of the dummy sub-pixel, that is, the dummy sub-pixel, not only has a function of the original dummy sub-pixel, but also has a function of discharging static electricity on the data line because the antistatic sub-pixel becomes an antistatic circuit, therefore, the width of the frame can be further compressed, which is beneficial to realize a full screen.

BRIEF DESCRIPTION OF DRAWINGS

The accompanying drawings, which are incorporated in and constitute a part of this specification, illustrate embodiments of the present disclosure and, together with the description, serve to explain principles of the present disclosure.

DESCRIPTION OF EMBODIMENTS

Figure 1:
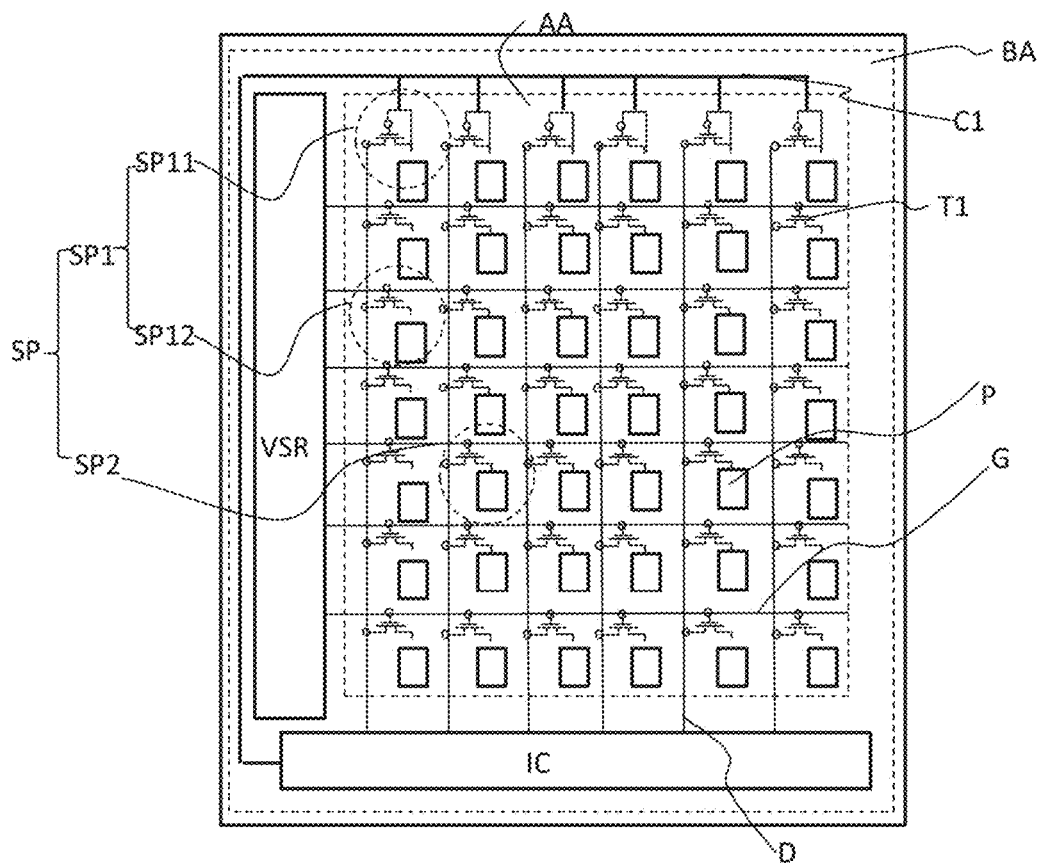
FIG. 1 is a structural schematic diagram of a display panel according to an embodiment of the present disclosure.

Various exemplary embodiments of the present disclosure will be described in detail with reference to the accompanying drawings. It should be noted that relative arrangements of the components and steps, numerical expressions and numerical values set forth in the embodiments are not intended to limit the scope of the present disclosure, unless otherwise specified.

The following description for at least one exemplar) embodiment is merely illustrative, and is in no way to limit the present disclosure and its application or use.

It should be noted that similar reference numerals and letters indicate similar items in the following accompanying drawings, and therefore, once an item is defined in one drawing, it is not required to be further discussed in the subsequent accompanying drawings.

A liquid crystal display panel is limited by its own material and manufacturing method. Filling of the liquid crystal molecules at the edge and at the middle of the display panel is not uniform. During a display process, when applying a same pixel voltage, the sub-pixels at the edge and the middle have different gray scales, which affects the display effect. In the related art, in order to solve the problem, a circle of sub-pixels near the outermost periphery of the frame in the display panel may generally be used as dummy sub-pixels which are not functioned as a pixel. For a display panel in which an antistatic circuit is arranged on an upper frame, the antistatic circuit is connected with the display sub-pixel via a dummy sub-pixel.

On this basis, the present disclosure proposes a technical solution capable of further compressing the upper frame of the display panel. The display panel has a pixel region and a frame region surrounding the pixel region. The pixel region includes sub-pixels. The plurality of sub-pixels includes display sub-pixels and dummy sub-pixels. The dummy sub-pixels are adjacent to the frame region and are located between the display sub-pixel and the frame region, and at least part of the dummy sub-pixels are antistatic sub-pixels. Each of the sub-pixels includes a transistor and a pixel electrode. The transistor includes a first gate electrode, a first source electrode, and a first drain electrode. The display panel further includes a data line configured to provide a driving signal to the display sub-pixels, a scan line configured to provide a scan signal to the display sub-pixels, and a first reference signal line configured to provide a static protection reference signal to the antistatic sub-pixels.

For the display sub-pixel, the first gate electrode of the first transistor included in the display sub-pixel is connected with the scan line, the first source electrode of the first transistor included in the display sub-pixel is connected with the data line, and the first drain electrode of the first transistor included in the display sub-pixel is connected with the pixel electrode.

For the antistatic sub-pixel, the first gate electrode of the first transistor included in the antistatic sub-pixel is connected with the first drain electrode and a first reference signal line, and the first source electrode of the first transistor included in the antistatic sub-pixel is connected with the data line.

That is to say, designing at least part of the dummy sub-pixels as an antistatic circuit, or moving the antistatic circuit to the position at which the dummy sub-pixels are located, provides a new concept of narrowing the frame. Compared with the display panel in the related art in which the dummy sub-pixels and the antistatic circuit are arranged completely independent of each other at different positions and the antistatic circuit is located at the upper frame, the upper frame according to the present disclosure has a smaller width which is beneficial to realize full screen.

Figure 2:
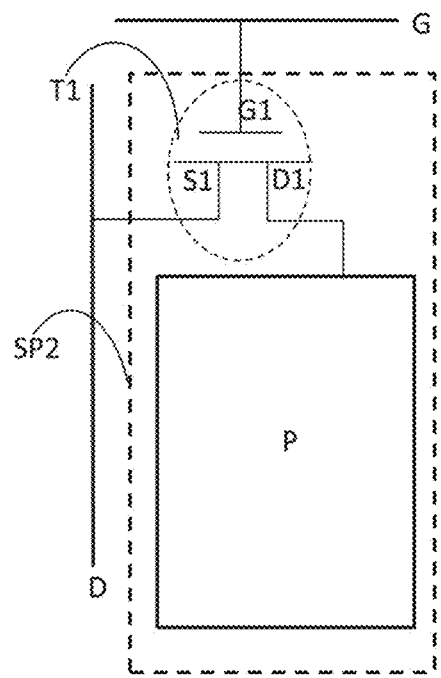
FIG. 2 is a schematic diagram showing a composition principle of a display sub-pixel in a display panel according to an embodiment of the present disclosure.
Figure 3:
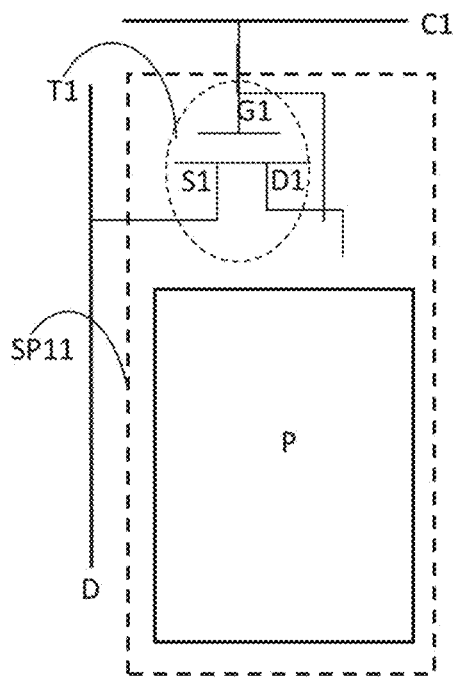
FIG. 3 is a schematic diagram showing a composition principle of an antistatic sub-pixel in a display panel according to an embodiment of the present disclosure.

FIG. 1 is a structural schematic diagram of a display panel according to an embodiment of the present disclosure. FIG. 2 is a schematic diagram showing a composition principle of a display sub-pixel in a display panel according to an embodiment of the present disclosure. FIG. 3 is a schematic diagram showing a composition principle of an antistatic sub-pixel in a display panel according to an embodiment of the present disclosure.

As shown in FIG. 1, the display panel has a pixel region AA and a frame region BA surrounding the pixel region AA. The pixel region AA includes sub-pixels SP, each of which includes a first transistor T1 and a pixel electrode P. As shown in FIGS. 2 and 3, the first transistor T1 includes a first gate electrode G1, a first source electrode S1, and a first drain electrode D1.

Continuing to refer to FIG. 1, the plurality of sub-pixels SP includes two types: display sub-pixels SP2 and dummy sub-pixels SP1. The dummy sub-pixel SP1 is adjacent to the frame region BA and is located between the display sub-pixel SP2 and the frame region BA. At least part of the dummy sub-pixels SP1 are the antistatic sub-pixel SP11, and the remaining dummy sub-pixels not serving as the antistatic sub-pixel SP11 are named as regular dummy sub-pixels SP12. Since the antistatic sub-pixels SP11 herein form a static protection circuit of a data line, the dummy sub-pixels arranged at the end of the data line are used as the antistatic sub-pixels SP11. In an embodiment of the present disclosure, a circle of the dummy sub-pixels SP1 surrounding all the display sub-pixels SP2 are formed at the periphery of the pixel region AA. The dummy sub-pixels SP1 closing to the upper frame are served as the antistatic sub-pixels SP11, and other dummy sub-pixels SP are served as the regular dummy sub-pixels SP12.

The display panel further includes a data line D configured to provide a driving signal to the display sub-pixels SP2, a scan line G configured to provide a scan signal to the display sub-pixels SP2, and a first reference signal line C configured to provide a static protection reference signal to the antistatic sub-pixels SP11.

For the display sub-pixel SP2, as shown in FIG. 2, the first gate electrode G1 of the first transistor T1 of the display sub-pixel SP2 is connected with the scan line G, the first source electrode S1 of the first transistor T1 of the display sub-pixel SP2 is connected with the data line D, and the first drain electrode D1 of the first transistor T1 of the display sub-pixel SP2 is connected with the pixel electrode P. In an embodiment of the present disclosure, referring to FIG. 1, the display panel further includes a scan circuit VSR and an integrated circuit chip IC. The scan line G is connected with the scan circuit VSR, and the scan circuit VSR controls the signal on the scan line G so that the scan line G on the display panel is written into an active level row by row, which active level causes the first transistor T1 to be turned on. The signal line D is connected with the integrated circuit chip IC. When the first transistor T1 is in a turn-on state, the integrated circuit chip IC may apply the pixel voltage displaying the gray scale to the pixel electrode through the data lin++e D so as to realize display.

For the dummy sub-pixel SP1, the difference from the display sub-pixel SP2 lies in that the dummy sub-pixel SP1 is not used for display, and is arranged at the periphery of the pixel region AA, such an arrangement can avoid over-etching during the etching process of forming the device which may destroy the display sub-pixel SP2 for display, affecting the display effect of the screen. On this basis, the first transistor T1 of the dummy sub-pixel SP1 may be disconnected from the scan line G and/or the data line D, or the first transistor T1 of the dummy sub-pixel SP1 may be disconnected from the pixel electrode P, or the pixel electrode P is not prepared. In an embodiment of the present disclosure, as shown in FIG. 1, the first transistor T1 of the dummy sub-pixel SP1 is disconnected from the pixel electrode P.

It should be noted that the pixel electrode P in FIG. 1 and subsequent drawings is only used to schematically show the connection relationship with the drain electrode of the transistor, and does not represent the shape and size of the transistor. Therefore, the shape and size thereof do not constitute a limitation to the meaning of the pixel electrode. For example, in order to indicate that the first transistor T1 of the dummy sub-pixel SP1 is disconnected from the pixel electrode P, the area of the pattern representing the pixel electrode P in the dummy sub-pixel SP1 in FIG. 1 is smaller than that of in the display sub-pixel SP2. However, this does not mean the area difference between the pixel electrodes P, and each of the pixel electrodes on the display panel may have a same shape and a same size.

For the antistatic sub-pixel SP11, as shown in FIG. 3, the first gate electrode G1 of the first transistor T1 of the antistatic sub-pixel SP11 is connected with the first drain electrode D1 and a first reference signal line C1, and the first source electrode S1 of the first transistor T1 of the antistatic sub-pixel SP11 is connected with the data line D, so that the antistatic sub-pixel SP11 forms an antistatic circuit. In an embodiment of the present disclosure, referring to FIG. 1, the first reference signal line C1 is connected with the integrated circuit chip IC. The integrated circuit chip IC inputs the reference signal of the antistatic circuit to the antistatic circuit via the first reference signal line C1, so as to realize static discharge.

When the first transistor T1 is a P-type transistor, the first gate electrode G1 of the first transistor T1 receives a high-level signal provided by the first reference signal line C1 as a reference signal. When the voltage value of the voltage signal on the data line D is greater than the voltage value of the high level signal, that is, for the first transistor T1, the potential of the gate electrode is lower than the potential of the source electrode, the first transistor T1 of the antistatic sub-pixel SP11 is conducted to realize the static discharge.

In an embodiment of the present disclosure, when the first transistor T1 is an N-type transistor, the first gate electrode G1 of the first transistor T1 receives a low level signal provided by the first reference signal line C1 as a reference signal. When the voltage value of the voltage signal on the data line D is less than the voltage value of the low-level signal, that is, for the first transistor T1, the potential of the gate electrode is higher than the potential of the source electrode, the first transistor T1 of the antistatic sub-pixel SP11 is conducted to realize the static discharge.

With the display panel provided by the embodiments of the present disclosure, the circuit connection of at least part of the dummy sub-pixels is changed, and embedding the antistatic circuit into the position at which the dummy sub-pixel is located, so that this part of the dummy sub-pixel, that is, the dummy sub-pixel mentioned in the above embodiments, not only has a function of the original dummy sub-pixel, that is, the antistatic sub-pixel does not display, which can avoid displaying the sub-pixels with different gray scales on the display panel with the same pixel voltage, but also has a function of discharging static electricity on the data line because the antistatic sub-pixel becomes an antistatic circuit. Compared with the display panel in the related art in which the dummy sub-pixel and the antistatic circuit are arranged completely independent of each other at different positions, the width of the frame can be further compressed, which is beneficial to realize a full screen.

Figure 4:
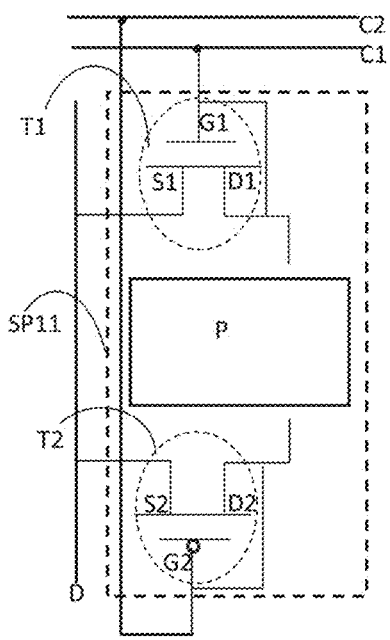
FIG. 4 is a schematic diagram showing a composition principle of an antistatic sub-pixel in a display panel according to another embodiment of the present disclosure.
Figure 5:
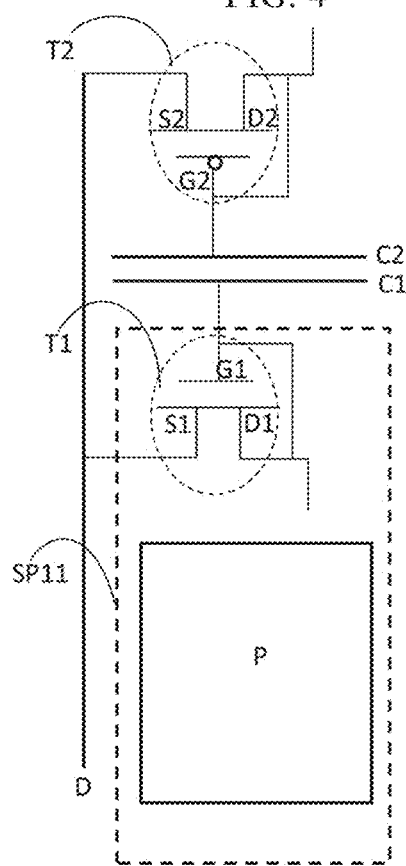
FIG. 5 is a schematic diagram showing a composition principle of an antistatic sub-pixel in a display panel according to another embodiment of the present disclosure.

Further, FIGS. 4 and 5 each is a schematic diagram showing a composition principle of another antistatic sub-pixel in a display panel according to an embodiment of the present disclosure. In order to arrange a complete antistatic circuit on the display panel, so that the antistatic circuit can play a role of antistatic when the voltage value on the data line is too large or too small, that is, the voltage range is not displayed by a normal gray scale line. In an embodiment of the present disclosure, as shown in FIGS. 4 and 5, the display panel further includes a second reference signal line C2 and a second transistor T2. As shown in FIG. 4, the second transistor T2 and the first transistor T1 may be arranged in a same antistatic sub-pixel SP11. As shown in FIG. 5, the second transistor T2 may be arranged outside the antistatic sub-pixel SP11, that is, arranged in the frame region. In the two arrangements, the first transistor T1 and the second transistor T2 can act together to form a complete antistatic circuit.

The second reference signal line C2 is configured to provide a low level signal when the first reference signal line C1 is configured to provide a high level signal, and the second reference signal line C2 is configured to provide a high level signal when the first reference signal line C1 is configured to provide a low level signal. The second transistor T2 includes a second gate electrode G2, a second source electrode S2, and a second drain electrode D2, the second gate electrode G2 is connected with the second drain electrode D2 and the second reference signal line C2, and the second source electrode S2 is connected with the data line D.

Channel types of the first transistor T1 and the second transistor T2 are different. When the first transistor T1 is a P-type transistor and the second transistor T2 is an N-type transistor, the first reference signal line C1 is configured to provide a high level signal and the second reference signal line C2 is configured to provide a low level signal. If the voltage value of the voltage signal on the data line D is greater than that of the high level signal, the first transistor T1 is conducted to realize the static discharge. If the voltage value of the voltage signal on the data line D is smaller than the voltage value of the low level signal, the second transistor T2 is conducted to realize the static discharge. The static electricity can all be discharged regardless of whether the voltage value on the data line is too large or too small.

In an embodiment of the present disclosure. When the first transistor T1 is an N-type transistor and the second transistor T2 is a P-type transistor, the first reference signal line C1 is configured to provide a low level signal and the second reference signal line C2 is configured to provide a high level signal. If the voltage value of the voltage signal on the data line D is greater than that of the high level signal, the second transistor T2 is conducted to realize the static discharge. If the voltage value of the voltage signal on the data line D is smaller than the voltage value of the low level signal, the first transistor T1 is conducted to realize the static discharge. The static electricity can all be discharged regardless of whether the voltage value on the data line is too large or too small.

Figure 6:
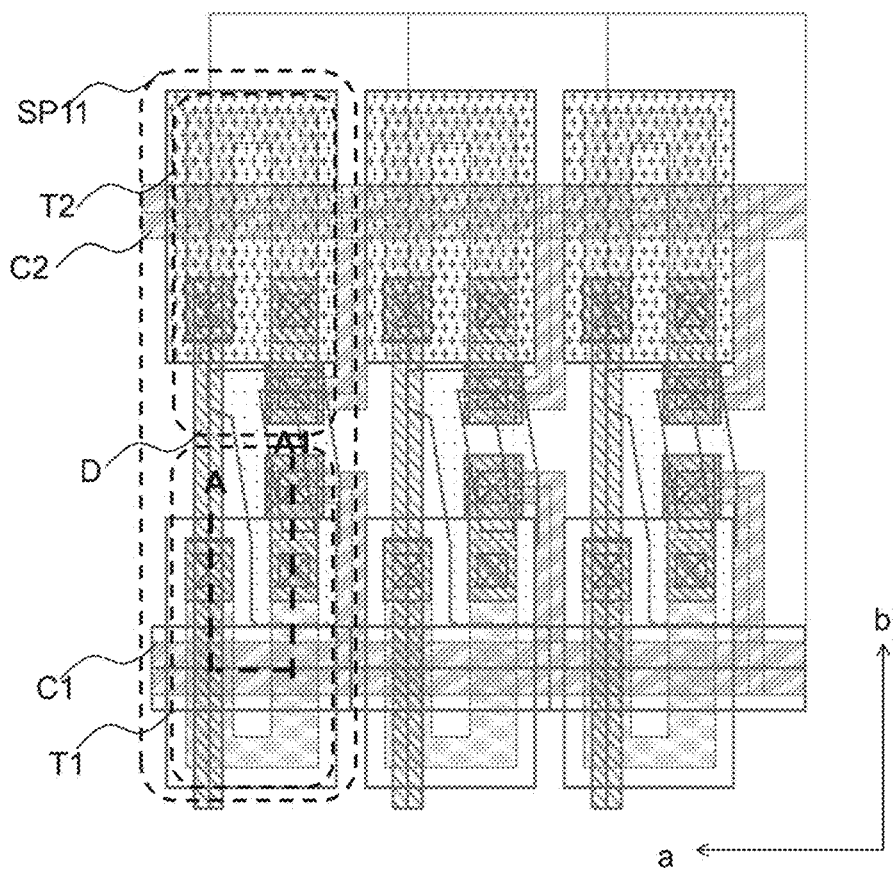
FIG. 6 is a schematic diagram showing a wiring manner of an antistatic sub-pixel in a display panel according to an embodiment of the present disclosure.

For the case where the second transistor is arranged in the antistatic sub-pixel, further, FIG. 6 is a diagram showing a wiring manner of an antistatic sub-pixel in a display panel according to an embodiment of the present disclosure. In an embodiment of the present disclosure, as shown in FIG. 6, a first direction a is an extending direction of the scanning line in the display panel, a second direction b is an extending direction of the data line in the display panel. In the second direction, the first transistor T1 and the second transistor T2 are oppositely arranged at two ends of the antistatic sub-pixel SP11, the source electrode of both the first transistor T1 and the second transistor T2 are connected with the data line D, the gate electrode and the drain electrode of the first transistor T1 are both connected with the first reference signal line C1, and the gate electrode and the drain electrode of the second transistor T2 are both connected with the second reference signal line C2. In the second direction b, the source electrodes of the first transistor T1 and the second transistor T2 are oppositely arranged in the antistatic sub-pixel SP11, and the drain electrodes of the first transistor T1 and the second transistor T2 are oppositely arranged. In a plane shown in FIG. 6, the source electrodes of the first transistor T1 and the second transistor T2 are both arranged at a position of the antistatic sub-pixel SP11 close to the left side thereof, and the drain electrodes of the first transistor T1 and the second transistor T2 are both arranged at a position of the antistatic sub-pixel SP11 close to the right side thereof.

Arranging the antistatic sub-pixel by using the wiring manner according to the embodiments of the present disclosure, the first reference signal line C1 and the second reference signal line C2 are far apart from each other, the mutual interference is small, and the source electrodes of the first transistor T1 and the second transistor T2 are oppositely arranged so as to facilitate wiring of the data line D.

Figure 7:
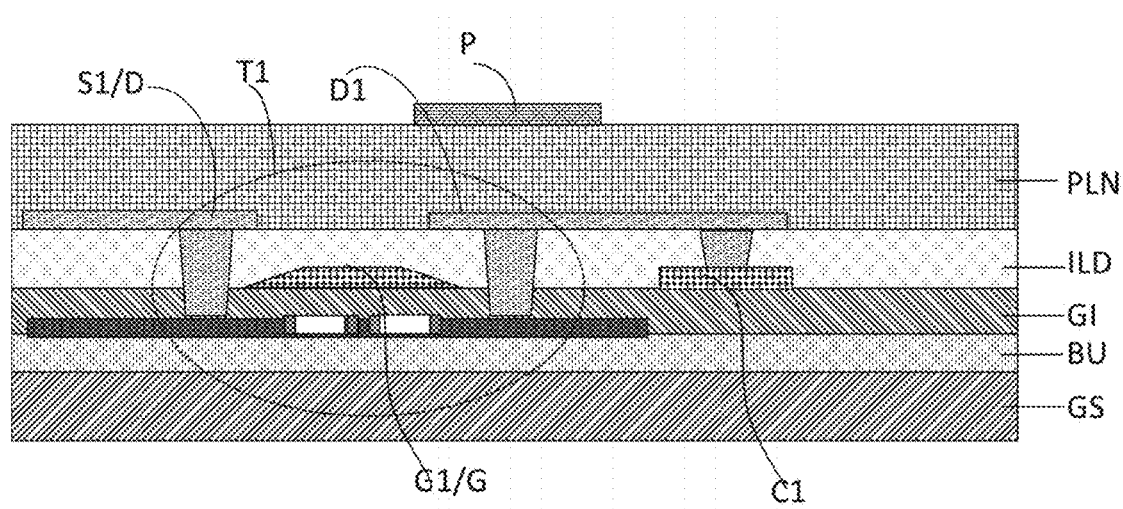
FIG. 7 is a cross-sectional view of an array substrate in a display panel along A-A1 direction in FIG. 6.

Further, FIG. 7 is a cross-sectional view of an array substrate in a display panel along A-A1 direction in FIG. 6. In an embodiment of the present disclosure, the display panel includes an array substrate, a color filter substrate, and a liquid crystal layer arranged on the array substrate and the color filter substrate. As shown in FIG. 7, the array substrate includes a glass substrate GS, a buffer layer BU, a gate insulation layer GI, a first metal layer, an interlayer insulation layer ILD, a second metal layer, a planarization layer PLN, and a pixel electrode arranged on the planarization layer PLN.

With reference to FIGS. 6 and 7, the first reference signal line C1, the second reference signal line C2, the gate electrodes of the first transistor T1 and the second transistor T2, and the scan line are prepared in a same layer, e.g., the first metal layer. The source electrodes of the first transistor T1 and the second transistor T2, the drain electrodes of the first transistor T1 and the second transistor T2, and the data line D are prepared in a same layer, e.g., the second metal layer.

FIG. 7 only provides a cross-sectional view showing the position of the first transistor T1 in FIG. 6. The cross-sectional view at the position of the second transistor T2 is the same as the cross-sectional view at the position of the first transistor T1. As shown in FIG. 7, the first transistor T1 includes the first gate electrode G1, the first source electrode S1, and the first drain electrode D1. The first gate electrode G1 is connected with the scan line G, the first source electrode S1 is connected with the data line D, and the first drain electrode D1 is connected with the pixel electrode P through a through hole. Meanwhile, the first drain electrode D1 is connected with the first reference signal line C1, and the first gate electrode G1 is also connected with the first reference signal line C (not shown).

Figure 8:
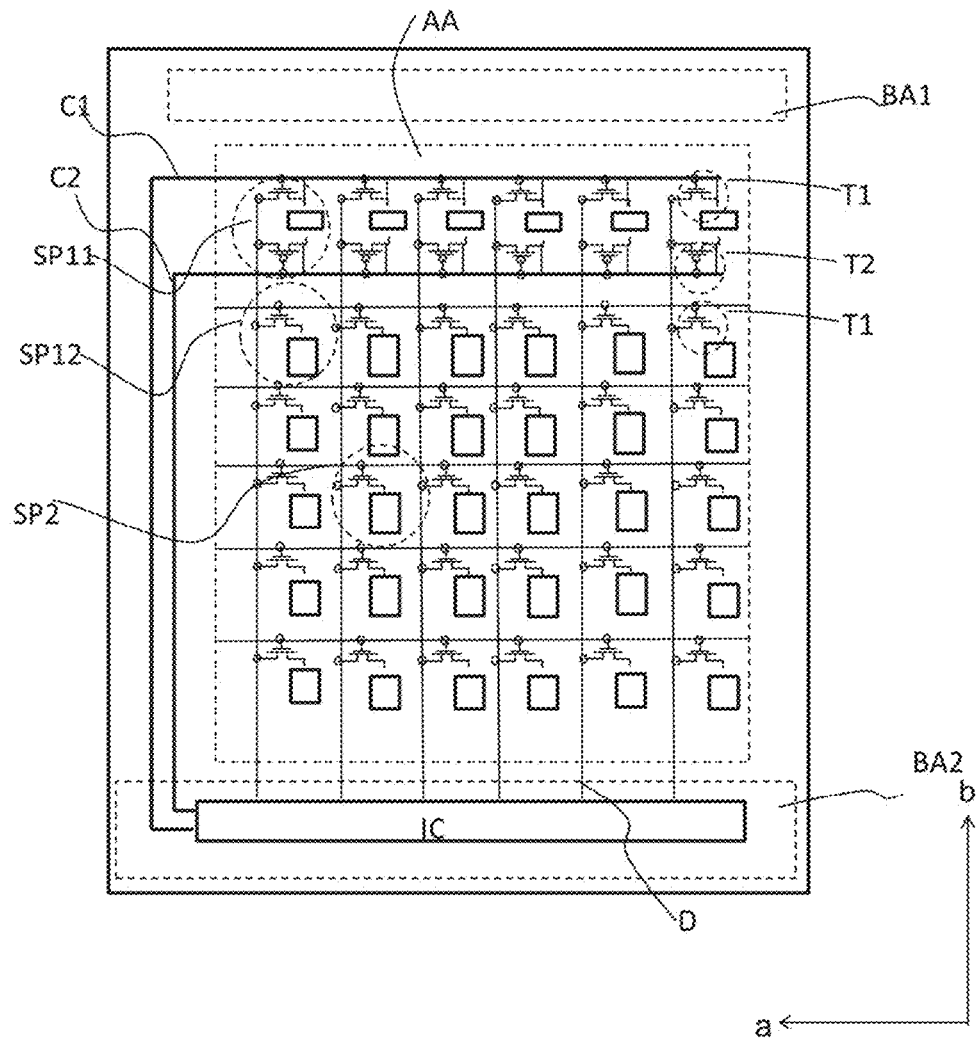
FIG. 8 is a structural schematic diagram of another display panel according to an embodiment of the present disclosure.

Further, FIG. 8 is a structural schematic diagram of another display panel according to an embodiment of the present disclosure. As shown in FIG. 8, the display panel has a rectangular shape, and includes a pixel region AA and a frame region. The frame region includes a first frame BA1 and a second frame BA2 oppositely arranged in the second direction b. An integrated circuit chip IC is arranged on the second frame BA2. Dummy sub-pixels are adjacent to the first frame BA1 and sequentially arranged in the first direction a is antistatic sub-pixels SP11, that is, an antistatic circuit is arranged at an end of the data line. Other dummy sub-pixels adjacent to the frame are the regular dummy sub-pixels SP12. The middle of the side of the dummy sub-pixel away from the side of the frame only has the display sub-pixels SP2. The first transistor T1 and the second transistor T2 are oppositely arranged in the antistatic sub-pixel SP11. The wiring manner may be as shown in FIGS. 6 and 7. The gate electrode of the first transistor T1 arranged in the antistatic sub-pixel SP11 is connected with the drain electrode and is connected to the first reference signal line C1. The gate electrode of the second transistor T2 is connected with the drain electrode, and is connected to the second reference signal line C2. The first transistor T1 and the second transistor T2 constitute a complete antistatic circuit. The static electricity can be discharged when the voltage value on the data line is too large or too small, while the width of the first frame BA1 is effectively narrowed.

Figure 9:
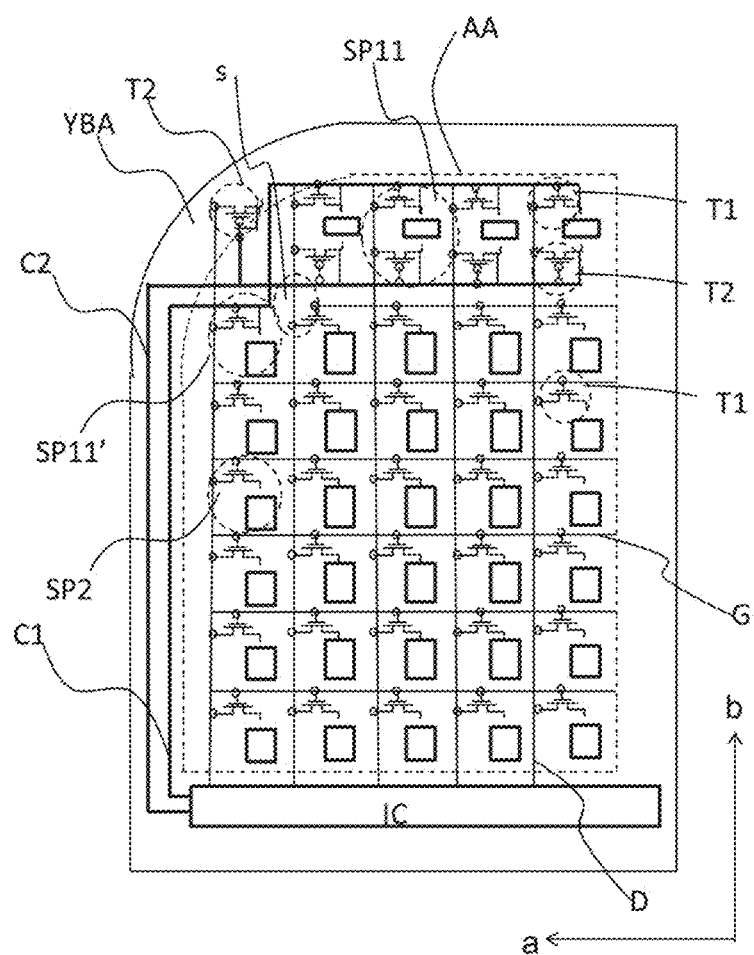
FIG. 9 is a structural schematic diagram of another display panel according to an embodiment of the present disclosure.

Further. FIG. 9 is a structural schematic diagram of another display panel according to an embodiment of the present disclosure. As shown in FIG. 9, the display panel is a profiled display panel which is a non-regular rectangle. The difference from the display panel shown in FIG. 8 lies in that a frame region of the profiled display panel includes a profiled frame YBA. The profiled frame YBA intersects with both of the extending direction a of the scanning line G and the extending direction b of the data line D.

For such a profiled display panel, when an antistatic circuit is arranged at an end of the data line, the sub-pixels located in the same pixel group to which the dummy sub-pixel SP11' adjacent to the profiled frame and located at the end of the data line belongs further includes a display sub-pixel SP2. Therefore, the relevant signal line driving the display sub-pixel SP2 to display the gray scale may pass through the dummy sub-pixel SP11'. Because of the wiring space occupied by the part of the signal line, the dummy sub-pixel SP11' adjacent to the profiled frame YBA and located at the end of the data line cannot simultaneously arrange the first transistor T1 and the second transistor T2. In order to enable the ends of the data line of such a profiled display panel to be provided with a complete antistatic circuit, as shown in FIG. 9, the dummy sub-pixel SP11' only arranges with the first transistor T1 and becomes the anti-static sub-pixel SP11'. The second transistor T2 that forms the complete antistatic circuit together with the first transistor T1 is arranged in the profiled frame YBA, and is not adjacent to the profiled frame YBA and located in the dummy sub-pixel SP11 at the end of the data line, the first transistor T1 and the second transistor T2 are still simultaneously arranged to form an antistatic sub-pixel SP11. The gate electrode of the first transistor T1 in the antistatic sub-pixel SP11 and the antistatic sub-pixel SP11' is connected with the drain electrode, and is connected to the first reference signal line C1. The gate electrode of the second transistor T2 in the antistatic sub-pixel SP11 and the profiled frame YBA is connected with the drain electrode, and is connected to the second reference signal line C2. The first transistor T1 and the second transistor T2 form a complete antistatic circuit. The static electricity can be discharged when the voltage value on the data line is too large or too small. Meanwhile, the profiled frame YBA only arranges a general antistatic circuit, which narrows the width of the profiled frame YBA.

Figure 10:
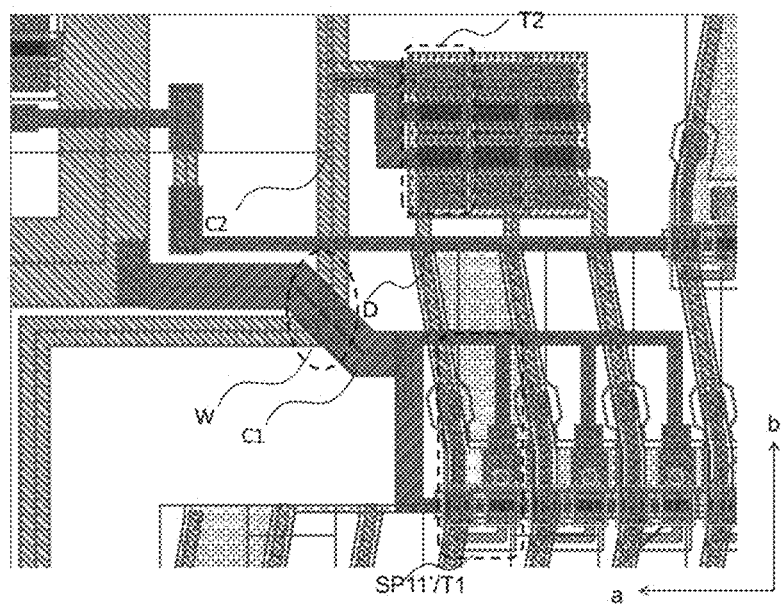
FIG. 10 is a schematic diagram showing a wiring manner of another antistatic sub-pixel in a display panel according to an embodiment of the present disclosure.

For the case where the second transistor is arranged in the frame region, further, FIG. 10 is a schematic diagram showing a wiring manner of another antistatic sub-pixel in a display panel according to an embodiment of the present disclosure. FIG. 10 shows the wiring manner of the first transistor T1 arranged in the antistatic sub-pixel SP11' and the second transistor T2 arranged in the profiled frame in the profiled display panel shown in FIG. 9. In an embodiment of the present disclosure, as shown in FIG. 10, a first direction a is an extending direction of the scanning line in the display panel, and a second direction b is an extending direction of the data line in the display panel. The first transistor T1 is arranged in the antistatic sub-pixel SP11', and the second transistor T2 is arranged in the frame region. The source electrodes of first transistor T1 and the second transistor T2 are both connected with the data line D. The gate electrode and the drain electrode of the first transistor T1 are both connected with the first reference signal line C1. The gate electrode and the drain electrode of the second transistor T2 are both connected with the second reference signal line C2.

Figure 11:
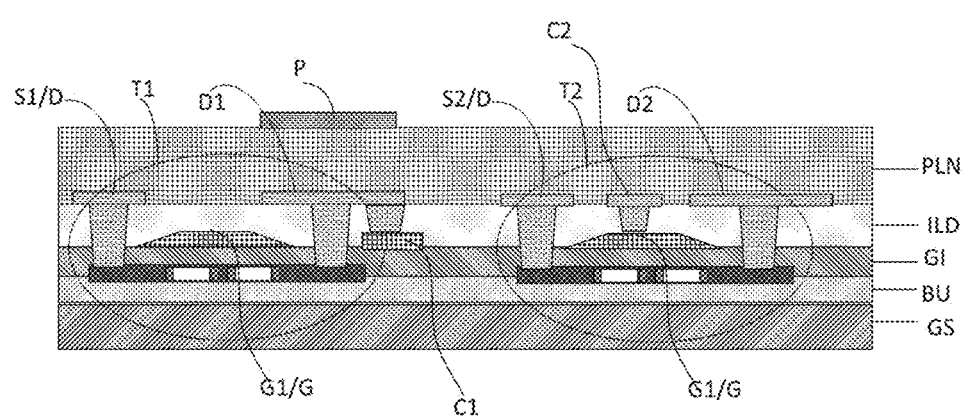
FIG. 11 is a cross-sectional view of another array substrate in a display panel according to an embodiment of the present disclosure.

Further, FIG. 11 is a cross-sectional view of another array substrate in a display panel according to an embodiment of the present disclosure. In an embodiment of the present disclosure, for a display panel in which a second transistor is arranged in a frame region, the display panel includes an array substrate, a color filter substrate, and a liquid crystal layer arranged between the array substrate and the color filter substrate. As shown in FIG. 11, the array substrate includes a glass substrate GS, a buffer layer BU, a gate insulation layer GI, a first metal layer, an interlayer insulation layer ILD, a second metal layer, a planarization layer PLN, and a pixel electrode arranged on the planarization layer PLN.

The first reference signal line C1, the first gate electrode G1 of the first transistor T1, the second gate electrode G2 of the second transistor T2, and the scan line G are prepared in a same layer, e.g., the first metal layer. The second reference signal line C2, the first source electrode S1 of the first transistor T1, the second source electrode S2 of the second transistor T2, and the first drain electrode D1 of the first transistor T1, and the second drain electrode D2 of the second transistor T2 and the data line D are prepared in a same layer, e.g., the second metal layer.

The first gate electrode G1 is connected with the scan line G, the first source electrode S1 is connected with the data line D, and the first drain electrode D1 is connected with the pixel electrode P through a through hole. Meanwhile, the first drain electrode D1 is connected with the first reference signal line C1, and the first gate electrode G1 is also connected with the first reference signal line C1 (not shown).

The second transistor T2 includes a second gate electrode G2, a second source electrode S2, and a second drain electrode D2. The second gate electrode G2 is connected with the scan line G, and the second source electrode S2 is connected with the data line D. Meanwhile, the second gate electrode G2 is connected with the second reference signal line C2, and the second drain electrode D2 is connected with the second reference signal line C2 (not shown).

In an embodiment of the present disclosure, by preparing the first reference signal line C1 and the scan line G in a same layer, and by preparing the second reference signal line C2 and the data line D in a same layer, a short-circuit between the reference signal line C1 and the second reference signal line C2 that may occur at the position W in FIG. 1 is avoided.

Further, at the position of the region S in the display panel as shown in FIGS. 9 and 11, in the profiled display panel, the antistatic sub-pixel is disconnected from the gate electrode of the first transistor T1 of the adjacent display sub-pixels in the extending direction a of the scan line. Therefore, the antistatic sub-pixel and the gate electrode of the adjacent display sub-pixel SP2 are independent from each other, and the first reference signal applied on the antistatic sub-pixels will not affect the turning-on or turning-off of the first transistor T1 in the display sub-pixel SP2, preventing the arrangement of the antistatic sub-pixel from affecting the display effect. The scan signal applied to the first transistor T1 on the scan line of the display sub-pixel SP2 will also not affect the first reference signal on the first reference signal line, thereby preventing the scan signal from affecting the reliability of the antistatic circuit.

Figure 12:
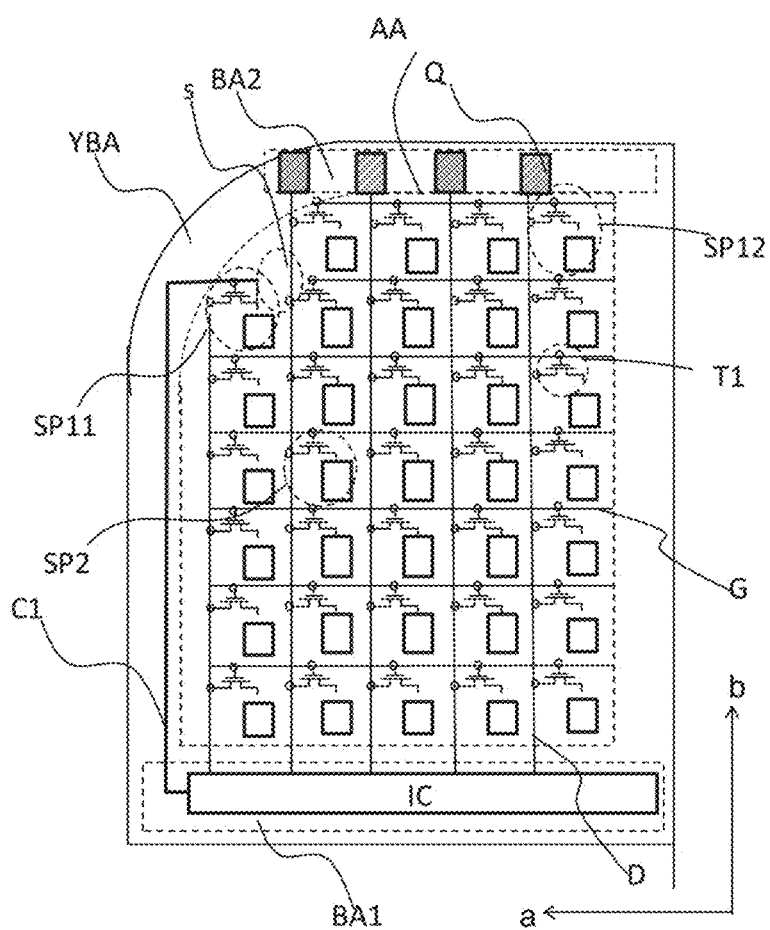
FIG. 12 is a structural schematic diagram of another display panel according to an embodiment of the present disclosure.

Further, FIG. 12 is a structural schematic diagram of another display panel according to an embodiment of the present disclosure. As shown in FIG. 12, the display panel is a profiled display panel which is a non-regular rectangle. The difference from a regular rectangular display panel lies in that the frame region of the profiled display panel includes a profiled frame YBA, and further includes a first non-profiled frame BA1 and a second non-profiled frame BA2 extending in the extending direction a of the scanning line G, respectively. The profiled frame YBA intersects with both of the extending direction a of the scan line G and the extending direction b of the data line D.

The display panel includes an integrated circuit chip IC arranged on the first non-profiled frame BA1. The antistatic circuit at an end of the data line D of the display panel includes an independent antistatic circuit Q and an antistatic circuit embedded in the dummy sub-pixel. The independent antistatic circuit Q is arranged on the second non-profiled frame BA2, and the antistatic circuit embedded in the dummy sub-pixel becomes the antistatic sub-pixel SP11. The antistatic sub-pixel SP11 is adjacent to the profiled frame YBA and located at an end of the data line D.

With the profiled display panel according to the embodiments of the present disclosure, a complete independent antistatic circuit Q is arranged at the position of the non-profiled frame BA2, thus the static electricity can be discharged no matter the voltage value on the data line is too large or too small. Meanwhile, in the dummy sub-pixel SP11 adjacent to the profiled frame YBA, a complete antistatic circuit can be arranged. Only a half of the antistatic circuit can be arranged at a position where the wiring space is relatively small, thereby the width of the profiled frame YBA is effectively narrowed.

Further, the first transistor of the antistatic sub-pixel has the same structure as the first transistor of the display sub-pixel, so that the overall display uniformity of the display panel is better. In an embodiment of the present disclosure, as shown in FIG. 6, the channel shape of the first transistor T1 may be designed a "U" shape.

Further, an aspect ratio of the first transistor is designed to be 1:1, ensuring that after embedding in the dummy sub-pixel, the antistatic circuit still has a good ability to discharge static electricity.

Embodiments of the display panel provided by the present disclosure are described as above. The present disclosure further provides a display device, which may be a mobile phone, a PAD or a tablet computer, etc., and includes any display panel provided by the present disclosure, having the effects of the above display panel, which will not be repeated any more.

It can be seen from the above embodiments that the display panel and the display device according to the present disclosure can realize the following beneficial effects:

The circuit connection of at least part of the dummy sub-pixels is changed, and embedding the antistatic circuit into the position at which the dummy sub-pixel is located, so that this part of the dummy sub-pixel, that is, the dummy sub-pixel mentioned in the above embodiments, not only has a function of the original dummy sub-pixel, but also has a function of discharging static electricity on the data line because the antistatic sub-pixel becomes an antistatic circuit. Therefore, the width of the frame can be further compressed, which is beneficial to realize a full screen.

What is claimed is:

1. A display panel, comprising:
   a pixel region and a frame region surrounding the pixel region, wherein
   the pixel region comprises a plurality of sub-pixels, each of the plurality of sub-pixels comprises a first transistor and a pixel electrode, the first transistor comprises a first gate electrode, a first source electrode, and a first drain electrode; the plurality of sub-pixels comprises display sub-pixels and dummy sub-pixels, the dummy sub-pixels are adjacent to the frame region and are located between the display sub-pixels and the frame region, and at least part of the dummy sub-pixels are antistatic sub-pixels;
   a data line configured to provide a driving signal to the display sub-pixels;
   a scan line configured to provide a scan signal to the display sub-pixels; and
   a first reference signal line configured to provide a static protection reference signal to the antistatic sub-pixels;
   wherein the first gate electrode of the first transistor of the display sub-pixel is connected to the scan line, the first source electrode of the first transistor of the display sub-pixel is connected to the data line, the first drain electrode of the first transistor of the display sub-pixel is connected to the pixel electrode, the first gate electrode of the first transistor of the antistatic sub-pixel is connected to the first drain electrode and connected to the first reference signal line, and the first source electrode of the first transistor of the antistatic sub-pixel is connected to the data line.

2. The display panel according to claim 1, further comprising:
   a second reference signal line, wherein the second reference signal line is configured to provide a low level signal when the first reference signal line is configured to provide a high level signal, and the second reference signal line is configured to provide a high level signal when the first reference signal line is configured to provide a low level signal; and
   a second transistor, wherein the second transistor comprises a second gate electrode, a second source electrode, and a second drain electrode, the second gate electrode is connected to the second drain electrode and connected to the second reference signal line, and the second source electrode is connected to the data line;
   wherein channel types of the first transistor and the second transistor are different.

3. The display panel according to claim 1, wherein
   the first transistor is a P-type transistor, and a gate electrode of the first transistor receives a high-level signal provided by the first reference signal line; or
   the first transistor is an N-type transistor, and a gate electrode of the first transistor receives a low-level signal provided by the first reference signal line.

4. The display panel according to claim 2, wherein
   the second transistor is an N-type transistor, and a gate electrode of the second transistor receives a low-level signal provided by the second reference signal line; and
   the second transistor is a P-type transistor, and a gate electrode of the second transistor receives a high level signal provided by the second reference signal line.

5. The display panel according to claim 2, wherein
   the second transistor is arranged in the antistatic sub-pixel.

6. The display panel according to claim 5, wherein
   the scan line extends in a first direction, the data line extends in a second direction, and the first direction intersects with the second direction;
   in the second direction, the first transistor and the second transistor are oppositely arranged at two ends of the antistatic sub-pixel; and
   in the second direction, in the antistatic sub-pixel, the first source electrode and the second source electrode are oppositely arranged, and the first drain electrode and the second drain electrode are oppositely arranged.

7. The display panel according to claim 6, wherein
   the first reference signal line, the second reference signal line, the first gate electrode, the second gate electrode, and the scan line are prepared in a same layer; and
   the first source electrode, the first drain electrode, the second source electrode, the second drain electrode, and the data line are prepared in a same layer.

8. The display panel according to claim 5, wherein
   the frame region comprises a first frame and a second frame oppositely arranged in the second direction;
   the display panel further comprises an integrated circuit chip arranged on the second frame; and
   the display panel comprises a plurality of the antistatic sub-pixels arranged in sequence in the first direction, and the antistatic sub-pixels are adjacent to the first frame.

9. The display panel according to claim 2, wherein
   the second transistor is arranged in the frame region.

10. The display panel according to claim 9, wherein
    the scan line extends in a first direction, the data line extends in a second direction, and the first direction intersects with the second direction;
    the display panel is a profiled display panel; and
    the frame region comprises a profiled frame on which the second transistor is arranged, wherein the profiled frame intersects with both the first direction and the second direction.

11. The display panel according to claim 1, wherein:
    the scan line extends in a first direction, the data line extends in a second direction, and the first direction intersects with the second direction;
    the display panel is a profiled display panel, and the display panel further comprises an independent antistatic circuit and an integrated circuit chip;
    the frame region comprises a profiled frame, a first non-profiled frame, and a second non-profiled frame, wherein the profiled frame intersects with both the first direction and the second direction, and the first non-profiled frame and the second non-profiled frame respectively extend in the first direction; and the integrated circuit chip is arranged on the first non-profiled frame, the independent antistatic circuit is arranged on the second non-profiled frame, and the antistatic sub-pixel is adjacent to the profiled frame.

12. The display panel according to claim 1, wherein
the scan line extends in a first direction, the data line extends in a second direction, and the first direction intersects with the second direction;
in the first direction, the antistatic sub-pixel is disconnected from a gate electrode of the first transistor of an adjacent display sub-pixel.

13. The display panel according to claim 9, wherein
the scan line extends in a first direction, the data line extends in a second direction, and the first direction intersects with the second direction;
in the first direction, the antistatic sub-pixel is disconnected from a gate electrode of the first transistor of an adjacent display sub-pixel.

14. The display panel according to claim 9, wherein
the first reference signal line, the first gate electrode, the second gate electrode, and the scan line are prepared in a same layer; and
the second reference signal line, the first source electrode, the first drain electrode, the second source electrode, the second drain electrode, and the data line are prepared in a same layer.

15. The display panel according to claim 1, wherein
the first transistor of the antistatic sub-pixel has a same structure as the first transistor of the display sub-pixel.

16. The display panel according to claim 15, wherein
the first transistor has a "U" shape.

17. The display panel according to claim 1, wherein
the first transistor has an aspect ratio of 1:1.

18. A display device comprising:
a display panel comprising:
a pixel region and a frame region surrounding the pixel region, wherein
the pixel region comprises a plurality of sub-pixels, each of the plurality of sub-pixels comprises a first transistor and a pixel electrode, the first transistor comprises a first gate electrode, a first source electrode, and a first drain electrode; the plurality of sub-pixels comprises display sub-pixels and dummy sub-pixels, the dummy sub-pixels are adjacent to the frame region and are located between the display sub-pixels and the frame region, and at least part of the dummy sub-pixels are antistatic sub-pixels;
a data line configured to provide a driving signal to the display sub-pixels;
a scan line configured to provide a scan signal to the display sub-pixels; and
a first reference signal line configured to provide a static protection reference signal to the antistatic sub-pixels;
wherein the first gate electrode of the first transistor of the display sub-pixel is connected to the scan line, the first source electrode of the first transistor of the display sub-pixel is connected to the data line, the first drain electrode of the first transistor of the display sub-pixel is connected to the pixel electrode, the first gate electrode of the first transistor of the antistatic sub-pixel is connected to the first drain electrode and connected to the first reference signal line, and the first source electrode of the first transistor of the antistatic sub-pixel is connected to the data line.

19. The display device according to claim 18, wherein the display panel further comprising:
a second reference signal line, wherein the second reference signal line is configured to provide a low level signal when the first reference signal line is configured to provide a high level signal, and the second reference signal line is configured to provide a high level signal when the first reference signal line is configured to provide a low level signal; and
a second transistor, wherein the second transistor comprises a second gate electrode, a second source electrode, and a second drain electrode, the second gate electrode is connected to the second drain electrode and connected to the second reference signal line, and the second source electrode is connected to the data line;
wherein channel types of the first transistor and the second transistor are different.

20. The display device according to claim 18, wherein
the first transistor is a P-type transistor, and a gate electrode of the first transistor receives a high-level signal provided by the first reference signal line; or
the first transistor is an N-type transistor, and a gate electrode of the first transistor receives a low-level signal provided by the first reference signal line.

* * * * *